United States Patent
Liu et al.

(10) Patent No.: US 7,710,965 B2
(45) Date of Patent: May 4, 2010

(54) METHOD AND SYSTEM FOR MULTI-PROGRAM CLOCK RECOVERY AND TIMESTAMP CORRECTION

(75) Inventors: Binfan Liu, Livermore, CA (US); Thomas Ayers, San Jose, CA (US); Weimin Zhang, San Jose, CA (US)

(73) Assignee: Broadlogic Network Technologies Inc., San Jose, CA (US)

(*) Notice: Subject to any disclaimer, the term of this patent is extended or adjusted under 35 U.S.C. 154(b) by 974 days.

(21) Appl. No.: 10/996,582

(22) Filed: Nov. 23, 2004

(65) Prior Publication Data

US 2006/0136768 A1 Jun. 22, 2006

(51) Int. Cl.
*H04J 3/06* (2006.01)

(52) U.S. Cl. .................. 370/392; 370/509; 348/512; 375/354

(58) Field of Classification Search ......... 370/503–518, 370/392; 375/355, 362–366; 348/512, 513
See application file for complete search history.

(56) References Cited

U.S. PATENT DOCUMENTS

| | | | | |
|---|---|---|---|---|
| 5,774,497 A | * | 6/1998 | Block et al. ............. | 375/226 |
| 5,920,572 A | * | 7/1999 | Washington et al. ..... | 370/535 |
| 6,055,246 A | | 4/2000 | Jones | |
| 6,266,384 B1 | * | 7/2001 | Acampora et al. ....... | 375/363 |
| 6,584,273 B1 | | 6/2003 | Ashley et al. | |
| 6,661,811 B1 | * | 12/2003 | Baker .................... | 370/516 |
| 6,744,782 B1 | * | 6/2004 | Itakura et al. .......... | 370/466 |
| 6,950,447 B2 | * | 9/2005 | Dieterich et al. ........ | 370/516 |
| 2002/0003799 A1 | * | 1/2002 | Tomita .................. | 370/392 |
| 2003/0185238 A1 | * | 10/2003 | Strasser et al. ......... | 370/473 |
| 2005/0226276 A1 | * | 10/2005 | Sanders et al. ......... | 370/503 |

* cited by examiner

*Primary Examiner*—William Trost, IV
*Assistant Examiner*—Roberta A Shand
(74) *Attorney, Agent, or Firm*—Townsend and Townsend and Crew LLP

(57) ABSTRACT

A decoder includes a transport engine configured to receive programs and extract timing information and timestamps embedded in the programs. An adder is configured to add a set of timing offsets to the sets of timing information to adjust the timing information from a first time basis to a second time basis. Sums of the timing offsets and the timing information are referred to the mapped-timing information. A correction engine is configured to update the timing offsets as timing information is encountered in the programs, and an offset register is configured to: receive the timing offsets, store the timing offsets, and transfer the timing offsets to the adder. The adder is also configured to add the timing offsets to the timestamps to adjust the time basis of the timestamps from the first time basis to the second time basis. A program is decoder configured to receive the adjusted timestamps to decode the programs.

33 Claims, 3 Drawing Sheets

METHOD AND SYSTEM FOR MULTI-PROGRAM CLOCK RECOVERY AND TIMESTAMP CORRECTION

BACKGROUND OF THE INVENTION

The present invention relates generally to apparatus and methods for decoding one or more programs transported in a transport stream, and more specifically to apparatus and methods for digitally adjusting the timing basis of timing information in one or more programs, which are transported in a transport steam, from an encoder-clock basis to a decoder-clock basis.

An established demand exists for the delivery of programs transported in transport streams to users. These programs might include audio programs, visual programs, audio-visual programs, game programs, computer programs and the like. Audio programs might include digital radio programs; visual program might include video programs that might not include sound tracks; audio-visual programs might include movie programs, television programs; and game programs might include Internet game programs played by users over the Internet or the like. The programs might be configured for use on one or more pieces of a user's audio and/or visual electronic equipment, such as a television, a set-top box, a videocassette recorder, a personal computer, a game station and the like.

A transport stream typically is sent from a "head end" over a communication link to a piece of electronic equipment. The head end typically embeds clock references into programs, such that the clock references include timing information of one or more encoder clocks used for encoding the programs. Transport streams are often transmitted over hybrid fiber coax (HFC), a satellite link, a terrestrial broadcast link and the like. Electronic equipment configured to receive a transport stream and play one or more programs transported in the transport stream typically includes a decoder, or might be coupled to a decoder, that is configured to decode the one or more programs.

A decoder is typically configured to extract program-clock references (PCRs) and timestamps from programs that are embedded in the programs at the head end. The PCRs might include time information and/or frequency information of one or more encoder clocks used to encode the programs. The extracted PCRs might be used by the decoder to synchronize the decoder's decoder clock to an encoder clock. Timestamps include similar timing information as PCRs and are typically used by a program-decoder module along with a synchronized-decoder-clock signal to decode a program. As referred to herein, a decoder might include a program-decoder module. Clock synchronization of a decoder clock to an encoder clock makes it possible for a program to be played back on a piece of electronic equipment in a predetermined manner (e.g., at a predetermined frame rate, with little or no flicker, with voice tracks synchronized to video tracks, etc.). A number of encoding formats are used for encoding programs in a transport stream. A number of standardized encoding formats that are gaining wide acceptance for program encoding have been developed by the Moving Picture Experts Group (MPEG). Various standards developed by MPEG include MPEG-1, MPEG-2, MPEG-4, MPEG-7, and MPEG-21, the latter of which has yet to be finalized. A number of the MPEG standards specify the use of embedded PCRs that are referred to in the MPEG standards as program-clock references (PCRs). PCRs serve as clock references of an encoder clock, and more specifically, are snapshots of the output of an encoder-clock counter that is configured to accumulate an encoder-clock signal generated, and output, by an encoder clock. An encoder-clock signal is typically a periodic signal, and an accumulated-encoder-clock signal is a summation of the periodic signals.

One traditional decoder technique for synchronizing a decoder clock to an encoder clock includes extracting the PCRs from a received program, and using the PCRs to adjust the clock signal of a voltage controlled oscillator (VCO) (e.g., a decoder clock). More specifically, the VCO might be adjusted by: i) sampling the PCRs in a program, ii) calculating the differences between an accumulated-clock signal of the VCO and the PCRs, and iii) using the differences to adjust the VCO output to synchronize the clock signals of the VCO to the encoder-clock signals and an encoder clock.

FIG. 1 is a simplified block diagram of a traditional decoder 100 that might be used to decode a program for presentation on a television or the like. The decoder might include a transport engine 105, a synchronization engine 110, and a program-decoder module 115. The transport engine is configured to receive a transport stream 120 transmitted from a head end 125. The head end might include one or more encoder clocks 130 used for encoding a plurality of programs that might be transported in the transport stream. The transport engine might include a PCR detector 135 configured to extract PCRs that are embedded in a program that is received in the transport stream. The PCRs might be used by the synchronization engine to synchronize the decoder-clock signals generated by the synchronization engine's VCO 145 to the encoder-clock signals represented by the PCRs. More specifically, the synchronization engine might include an adder 145, an analog low pass filter 150, the VCO 125, and a local time counter 160 that are configured to adjust the synchronization engine's VCO.

Traditional decoders and decoder techniques have a number of shortcomings. For example, if a traditional decoder is to decode two or more programs, the traditional decoder may include a number of synchronization engines matching the number of programs that are to be decoded by the decoder. That is, a traditional decoder might be able to decode only as many programs as the number of synchronization engines that are included in the decoder. For example, to decode three programs, a traditional decoder might include three synchronization engines and/or other duplicated components. Generally, each synchronization engine is dedicated to a given program being decoded because the synchronization engine primarily includes analog devices (e.g., the VCO), and the analog devices are configured to substantially continuously monitor the given program to synchronize the VCO to encoder clock 130 disposed at head end 125. As each synchronization engine is configured to substantially continuously monitor a program assigned to the synchronization engine, the synchronization engine is not configured to monitor more than one program at any given time. Therefore, a decoder configured to decode more than one program typically includes more than one synchronization engine as well as other components. The duplication of synchronization engines in a multi-program decoder is relatively costly, and tends to drive up the cost of manufacturing these decoders, and drive up the cost to manufacture a piece of electronic equipment (e.g., television, set-top box, etc.) that may include such a decoder.

Additionally, a traditional decoder that includes a single synchronization engine typically is not able to decode more than a single program at any given time, and thus limits a user's consumption to a single program at the given time. As program users become accustomed to consuming multiple programs at a given time, electronic products with the foregoing described limitation are not likely to satisfy these users.

Other traditional decoders suffer similar high cost limitations as the traditional decoders described above. For example, decoders that use least squares linear regression models (LSLRMs) to estimate PCRs tend to be costly. Decoders configured to use a LSLRM to estimate PCRs, typically calculate a PCR estimate for each PCR for each program decoded by the decoder. To decode a relatively large number of programs, relatively large computing power should be available to the decoder. Relatively large computing power tends to be costly and tends to drive up the cost to manufacture these traditional decoders.

Therefore, a need exists for decoders that can decode one or more programs, are easy to use, and that are relatively inexpensive to manufacture.

BRIEF SUMMARY OF THE INVENTION

The present invention provides an apparatus and method for substantially simultaneously decoding a plurality of programs. In short, this is made possible by a decoding system that includes a transport engine configured to receive a set of programs and extract from each program a set of timing information and a set of timestamps embedded in the program. The system further includes an adder configured to sum a timing offset from a set of timing offsets to each of the sets of timing information to adjust the sets of timing information from a first time basis to a second time basis. The sums of the timing offsets and the timing information are referred to the mapped-timing information. The programs are associated, respectively, with the timing offsets. The system further includes a correction engine configured to update the timing offsets as timing information is encountered in the programs. The system further includes an offset register configured to: receive the timing offsets from the correction engine, store the timing offsets, and transfer these timing offsets to the adder. The adder is configured to add the timing offsets to the timestamps to adjust the time basis of the timestamps from the first time basis to the second time basis. The sums of the timing offsets and the timestamps are referred to as a mapped timestamps. The system further includes a program decoder configured to receive the mapped timestamps to decode the programs. Each of the timing offsets is associated with one of the sets of timing information and one of the sets of timestamps, and the adder is configured to sum associated timing offsets and timing information, and sum associated timing offsets and timestamps.

According to a specific embodiment, the adder includes a first adder and a second adder, the first adder is configured to add the timing offsets to the timing information, and the second adder is configured to add the timing offsets to the timestamps. According to another specific embodiment, the correction engine includes: a decoder clock configured to generate a decoder-clock signal; a local-time counter configured to receive the decoder-clock signal and accumulate the decoder-clock signal to generate accumulated-clock signals a comparator configured to calculate differences between the accumulated-clock signals and the mapped-timing information, wherein the differences are the set of timing offsets; a digital low pass filter (LPF) configured to receive the set of timing offsets from the comparator and filter the set of timing offsets; and a digital phase lock loop (PLL) configured to receive the set of timing offsets from the digital LPF and reduce jitter (e.g., timing and/or frequency differences of received packets in a program arising from atmosphere variation, material variation, network congestion, timing drift, route changes, etc.) of an encoder clock signal arising from program transport) in the set of timing offsets, wherein the digital PLL is configured to transfer the set of timing offsets to the offset register. The transport engine might include a packet-identifier (PID) table configured to store a program number and a set of PID numbers for each program; and a packet-identification (PID) filter configured to: extract PID numbers embedded in the programs, transfer the PID numbers to the PID table to retrieve the program numbers associated with the PED numbers, and transfer the program numbers to the offset selector to select the timing offsets associated with the program numbers.

According to another embodiment, a decoding system for decoding a set of programs includes a transport engine configured to receive a plurality of programs transported in a transport stream and extract program-clock references (PCRs) and timestamps from the programs; an adder configured to sum the PCRs with PCR offsets to adjust the PCRs from an encoder-clock basis to a decoder-clock basis, the sums are referred to as the mapped PCRs, each of the programs is associated with a PCR offset, wherein the PCR offsets represent timing differences between the encoder-clock basis and the decoder-clock basis; a correction engine configured to update the PCR offsets as PCRs are encountered in the programs; an offset register configured to receive the PCR offsets from the correction engine and transfer the PCR offsets to the adder, wherein the adder is configured to add the PCR offsets to the timestamps to map the timestamps from the encoder-clock basis to the decoder-clock basis, wherein summed timing offsets and timestamps are referred to as mapped timestamps; and a program decoder configured to receive the mapped timestamps to decode the program substantially simultaneously.

According to another embodiment, a multi-program decoding method includes receiving a transport stream that includes a plurality of programs; extracting, from each program, a set of program-clock references (PCRs) and a set of timestamps that are associated with a first timing basis; generating, based on the PCRs and a decoder-clock signal, a set of timing offsets that represents a difference between the first timing basis and a second timing basis, wherein each timing offset is associated with one of the programs and with this programs PCRs and timestamps; adding the timing offsets, respectively, to the timestamps that are respectively associated with the timing offsets to adjust the timing basis of the timestamps from the first timing basis to the second timing basis; and decoding one or more of the plurality of programs based on the timestamps adjusted to the second timing basis.

According to a specific embodiment, the step of generating the set of timing offsets includes mapping the PCRs from the first timing basis to the second timing basis based on the timing offsets, wherein the PCRs in the second timing basis are referred to as the mapped PCRs; and generating differences between the mapped PCRs and the decoder-clock signals, wherein the differences are the timing offsets.

A further understanding of the nature and advantages of the present invention may be realized by reference to the remaining portions of the specification and the drawings.

DESCRIPTION OF SPECIFIC EMBODIMENTS

Introduction

Users of electronic systems have become accustomed to consuming multiple programs transmitted to their electronic systems in a transport stream. For example, modem televisions tend to provide picture-in-picture capabilities. To provide a picture-in-picture capability, these modem televisions are configured to decode two or more programs, substantially simultaneously. Further, programs have become more complex, for example, with a single television event (e.g., a movie) being transmitted in multiple programs to provide users with enhanced sound track options, language options and the like. A television configured to decode a plurality of programs might include a plurality of decoders or a decoder that includes a plurality of synchronization engines. The duplication of decoders in a piece of electronic equipment tends to drive up the cost and size of the electronic equipment. Embodiments of the present invention are aimed at addressing the foregoing described decoder problems as well as other problems described below.

Decoder Embodiments

Figure 1:
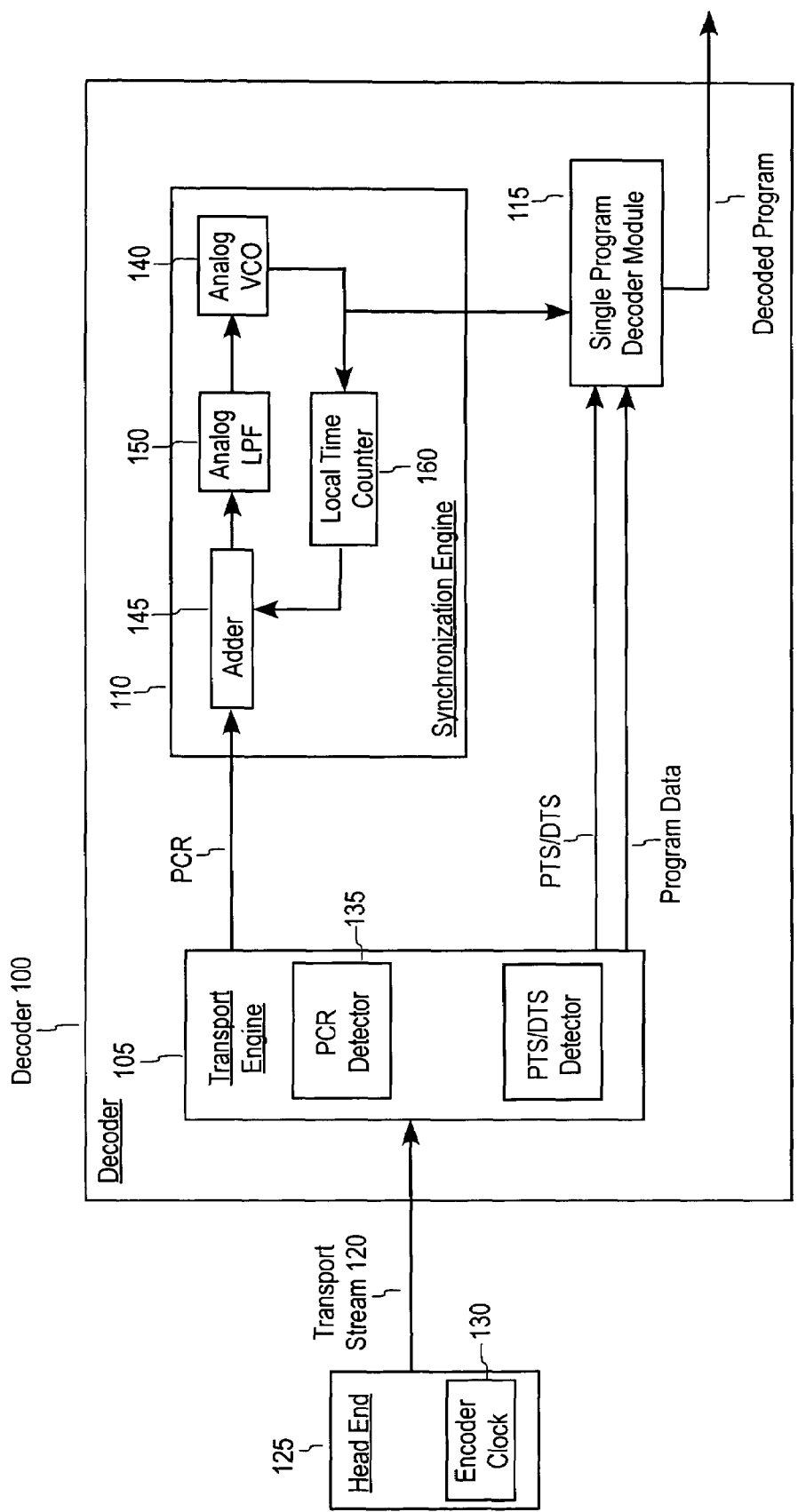
FIG. 1 is a simplified block diagram of a prior art decoder configured to decode a single program transported in a transport stream, and synchronize a decoder clock to an encoder clock used for encoding the program.
Figure 2:
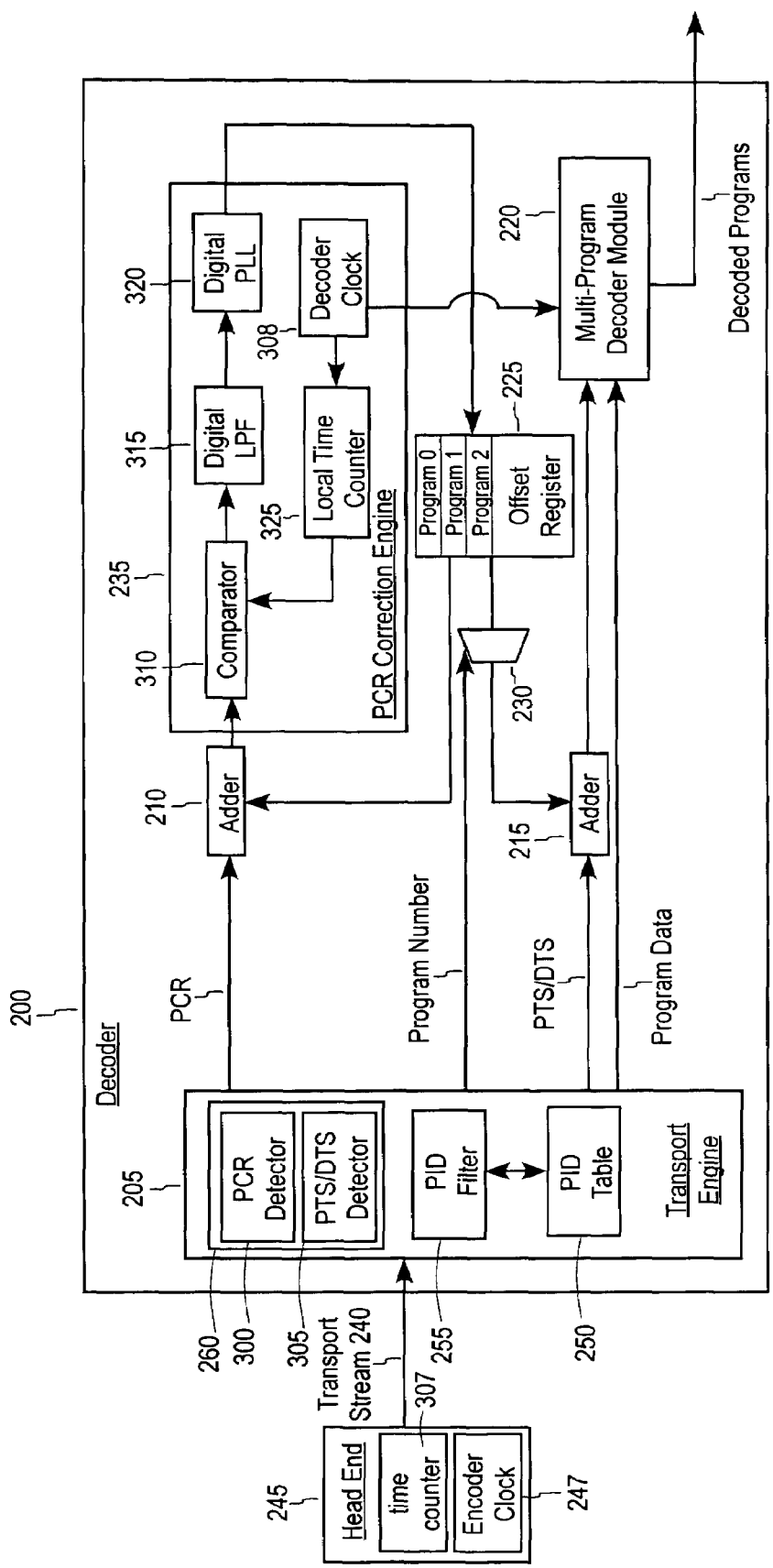
FIG. 2 is a simplified block diagram of a decoder configured to decode a set of programs transported in a transport stream, and digitally adjust the PCRs embedded in the programs to decode the programs according to an embodiment of the present invention.

FIG. 2 is a simplified block diagram of a decoder 200 according to one embodiment of the present invention. Decoder 200 includes a transport engine 205, first and second adders 210 and 215, respectively, a multi-program decoder 220, an offset register 225, an offset selector 230, and a program-clock reference (PCR) correction engine 235. Decoder 200, and more specifically, transport engine 205 is configured to receive a transport stream 240 from a head end 245 that might include one or more encoder clocks 247.

Transport stream 240 might include a set of encoded programs, such as one or more television programs, movie programs, game programs, audio programs, computer programs or the like. As referred to herein, a set includes one or more elements. For example, a set of program includes one or more programs. Programs might be encoded in a variety of encoding formats, such as one of the MPEG encoding formats including, for example, MPEG-1, MPEG-2, MPEG-4, MPEG-7, and MPEG-21, the latter of which has yet to be finalized. The MPEG encoding formats specify a number of program formats that will not be discussed in detail herein except as the program formats relate to embodiments of the present invention.

Decoder 200 is configured to decode one or more programs from a set of programs transported in transport stream 240. The decoder may decode two or more programs substantially simultaneously. More specifically, program packets of different programs might be decoded in an alternating manner as the programs are generally decoded substantially simultaneously. Decoded programs might be used by one or more pieces of electronic equipment to play the programs, record the program or the like. Electronic equipment configured to use the decoded programs might include a television, a set-top-box, a video recorder (e.g., a videocassette recorder, a videodisk recorder, etc.), a personal computer, a game system or the like.

According to one embodiment, transport engine 205 is configured to parse a number of received programs (e.g., programs selected for decoding) to extract packet data embedded in the received programs. Transport engine 205 might include a packet identifier (PID) table 250, a PID filter 255, and a transport-stream processor 260. PID table 250 is configured to store a program number for each program being decoded by the decoder. The PID table might also be configured to store the PIDs that identify the various program packets of the programs, such as voice packets, video packets and the like. A program's program number and PIDs are typically included in one or more tables in a program header. On receipt of a program's program header, the program number and the PIDs associated with the program may be extracted from the header by PID filter 255 and are stored in the PID table. As programs are streamed to the PID filter, the PID filter may further be configured to extract PIDs from program packets as the program packets are encountered in the streams. The PID filter is configured to use the extracted PIDs to retrieve program numbers from the PID table. The program numbers are then used to fetch program-clock reference (PCR) offsets stored in offset register 225. For example, the PID filter might transfer a retrieved program number to an offset selector 230 that is configured to retrieve a PCR offset that is associated with the program having the retrieved program number. PCRs and PCR offsets are described in detail below.

According to one embodiment, transport-stream processor 260 includes a PCR detector 300 and a presentation timestamp/decoding timestamp (PTS/DTS) detector 305. PCR detector 300 is configured to extract PCRs from the received programs as the PCR are encountered in the programs, or more specifically, encountered in the program packets of the programs. While PCRs are clock references that are specified by a number of the MPEG formats, as referred to herein, PCRs include nearly any clock reference that might be embedded in a program, wherein the clock references include timing information, such as the timing information of an encoder clock.

More specifically, PCRs might represent temporal snapshots of a time counter 307 that is coupled to an encoder clock and is configured to accumulate the clock signals of the encoder clock. Timing information might include time information, frequency information, phase information or the like of an encoder clock. Time information might refer to accumulated time that is accumulated by the time counter. Accumulated time might include the temporal position of a program packet and its associated payload (e.g., audio and/or video frames) relative to other program packets (e.g., a program header) and their associated payloads. Frequency information and phase information might include the instantaneous frequency information and instantaneous phase information of a program packet relative to other program packets.

Subsequent to the extraction of a PCR from a program, transport engine 205 is configured to transfer the PCR to adder 210. Adder 210 is configured to add the PCR to a PCR offset that is associated with the program from which the PCR was extracted. Recall that each program decoded by the decoder is associated with a select PCR offset that is stored in offset register 225. PCR offsets are used to adjust (also referred to herein sometimes as map) the time basis of PCRs from an encoder-clock basis to a decoder-clock basis. More specifically, the PCR offsets represent the time difference and frequency differences between an encoder clock used for encoding a program and a decoder clock 308 (described in further detail below) used for decoding the program. More specifically yet, the PCR offsets are used by adder 210 to reduce the time differences between the timing information of the PCRs and the timing information of decoder clock 308; and the PCR offsets are used by adder 210 to reduce frequency differences between the frequency information of the PCRs and the frequency information decoder clock 308. For convenience, the sum of a PCR and a PCR offset (i.e., output of adder 210) is referred to herein as a mapped PCR.

Each PCR offset is updated for each PCR extracted from a program. That is, the difference in the encoder-clock basis and the decoder-clock basis is calculated for each PCR. The PCR offset for each PCR is updated by PCR correction engine 235. According to one embodiment, the PCR correction engine includes a comparator 310, a digital low pass filter (LPF) 315, a digital phase lock loop (PLL) 320, the decoder clock 308, and a local-time counter 325. Local-time counter 325 is configured to accumulate the periodic output of decoder clock 308. According to one embodiment, the PCR offsets are the output of comparator 310 that is configured to calculate the differences between the mapped PCRs and the accumulated-clock signal. More specifically, the output of comparator 310 includes the calculated differences, respectively, between the time information and the frequency information of the mapped PCRs and the time information and the frequency information of the accumulated-clock signals.

According to one embodiment, the digital LPF and the digital PLL are configured to compensate for timing jitter of program packets received by the decoder in the transport stream. Timing jitter might be generated from various transmission delays in the transmission links and/or network uncertainties. The digital LPF might be a finite impulse response (FIR) LPF, an infinite impulse response (IIR) LPF or other digital LPF. The PCR offsets transmitted from the digital PLL are transmitted to offset register 225 for storage. As successive PCRs are encountered in the programs, the PCR offsets are retrieved from the offset register to adjust the time basis of the PCRs from the time basis of the encoder clocks used to encode the programs to the time basis of the decoder clock used to decode the programs. According to one embodiment, each initial PCR offset, which is associated with a first PCR extracted from a program, might be set to a predetermined value, such as zero, or might be set to an arbitrary value. For example, both the time difference and the frequency difference represented by an initial PCR offset might be set to zero. The initial PCR offsets are stored in offset register 225.

According to one embodiment, the PCR offsets are retrieved from the offset register to adjust the time bases of the PTSs and/or DTSs as the PTSs and/or DTSs are transferred to multi-program decoder module 220, which is configured to decode the one or more programs that are selected for decoding. Embodiments of multi-program decoder module 200 are described in U.S. Pat. No. 6,704,372, titled "Digital Implementation of Multi-Channel Demodulators," filed Sep. 18, 2001, which is owned by the owner of the present invention and is incorporated by reference herein in its entirety for all purposes. PTSs and DTSs are well understood by those of skill in the art and will not be described in detail except to note that these timestamps include time information and frequency information for the times at which frames and the like are to be played relative to the PCRs. That is the PCR include absolute timing information and frequency information, and the PTSs and DTSs include timestamps for the time frames and the like are to be played. For example, a given set of PTSs and DTSs might include information that indicates that given frames are to be played at time t1. When time t1 is indicated by the local clock, the given frames will be played.

The time bases of the PTSs and/or DTSs are adjusted from the time bases of one or more encoder clocks used to encode the programs to the time basis of the decoder clock. These time bases are adjusted by adder 215 that is configured to add the PCR offsets to the PTSs and/or DTSs. For convenience, the adjusted PTSs and DTSs are referred to respectively as the mapped PTSs and the mapped DTSs. Adder 215 is configured to transfer the mapped PTSs and/or the mapped DTSs to the multi-program decoder module for program decoding. The decoded programs might be used by one or more pieces of electronic equipment to play the programs. For example, a television might be configured to receive two or more decoded programs to present one or more of the decoded programs in a picture-in-picture window or the like. According to another example, one decoded program might be transferred to a recording device for recording and another program transferred to a television for playing. The decoded programs might be used at a number of locations (e.g., the homes of a neighborhood, a number of business offices, etc.) for use on various pieces of electronic equipment that are at the locations.

Figure 3:
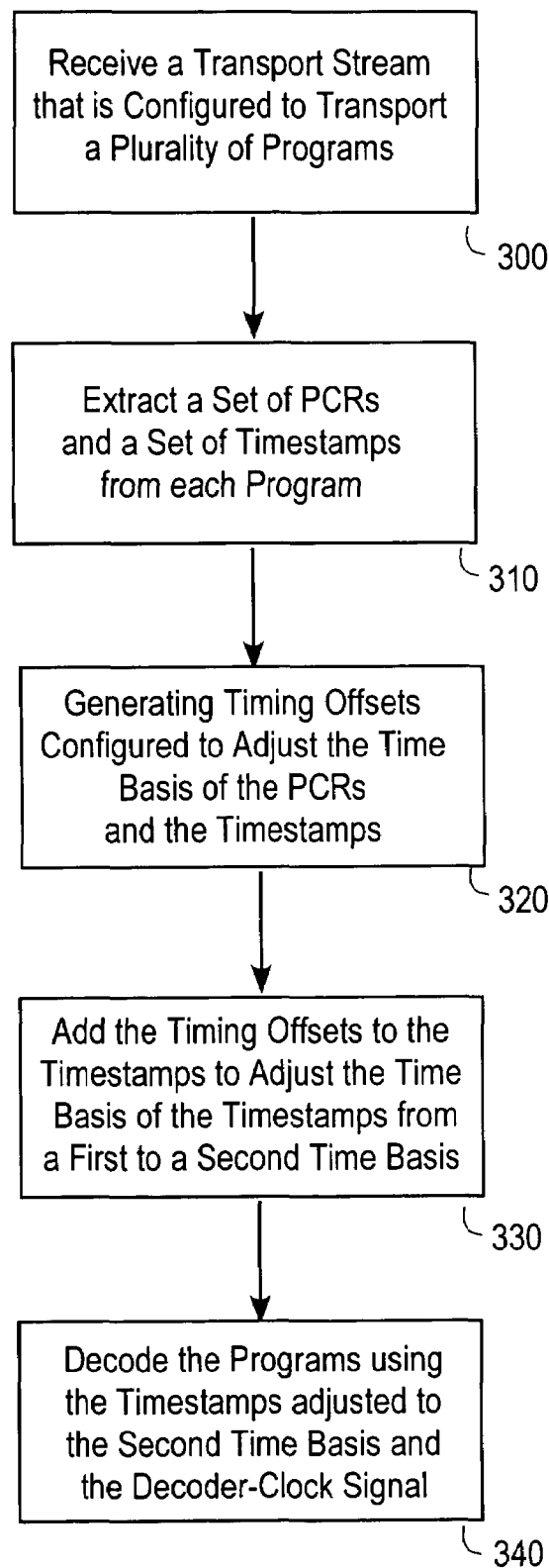
FIG. 3 is a high-level flow chart having steps for decoding one or more programs according to an embodiment of the present invention.

FIG. 3 is a high-level flow chart having steps for decoding a plurality of programs, for example, substantially simultaneously. The high-level flow chart is illustrative of an exemplary embodiment, and those of skill in the art will recognize various steps that might be added, deleted, and/or modified and are considered to be within the purview of the present invention. Therefore, the exemplary embodiment should not be viewed as limiting the invention as defined by the claims. At 300, a transport stream is received that includes a plurality of programs. At 310, from each program, a set of program-clock references (PCRs) and a set of timestamps are extracted. The PCRs and timestamps are associated with a first timing basis, such as an encoder-clock timing basis.

At 320, based on the PCRs and a decoder-clock signal, a set of timing offsets (e.g., PCR time offsets) is generated that represents a difference between the first timing basis and a second timing basis. Each timing offset is associated with one of the programs and with this program's PCRs and timestamps. According to a specific embodiment, generating the timing offsets might include mapping the PCRs from the first timing basis to the second timing basis based on the timing offsets. The PCRs in the second timing basis are referred to as the mapped PCRs. The specific embodiment might further include generating differences between the mapped PCRs and the decoder-clock signals, such that the differences are the timing offsets. It is noted that the second timing basis might be a decoder-clock timing basis.

At 330, the timing offsets are respectively added to the timestamps that are respectively associated with the timing offsets. The adding steps provides for the adjustment of the timing basis of the timing stamps, such as from the first timing basis to the second timing basis. At 340, one or more of the plurality of programs are decoded by a decoder module that is configured to use the timestamps adjusted to the second timing basis for decoding the programs.

CONCLUSION

It is understood that the examples and embodiments described herein are for illustrative purposes only that various modifications or changes in light thereof will be suggested to persons skilled in the art and are to be included within the spirit and purview of this application and scope of the appended claims. For example, while decoder embodiments have been described that are configured to extract PCRs (which might be MPEG formatted clock references) from programs, the decoder embodiment described herein may be configured to extract and use timing information from programs formatted according to a variety of other specifications. According to another example, while program numbers have been described as being included in a program header, if a program does not include a program number in a program header, one or more components (e.g., the PID filter) might be configured to assign a program number to the program. Further, while decoder embodiments have been described as being configured to decode a plurality of programs, substantially simultaneously, the decoder embodiments might be configured to decode a single program. Further yet, decoder embodiments described herein might be implemented in hardware, firmware, and/or software in an integrated or distributed manner. For example, a hardware embodiment might include an application specific integrated circuit (ASIC), an ASIC configured to operate in cooperation with other circuits, such as external memories, processors, programmable logic, gate arrays or the like. The hardware embodiment might further and/or alternatively include programmable logic, such as a programmed field programmable gate array (FPGA), an FPGA configured to operate in cooperation with an ASIC, external memory or the like. Further yet, while encoder embodiments have been described as including two adders, some decoder embodiments may include a single adder configured to perform adding as described herein. Therefore, the above description should not be taken as limiting the scope of the invention as defined by the claims. It is noted that all publications, patents, and patent applications cited herein are hereby incorporated by reference for all purposes in their entireties.

What is claimed is:

1. A decoding system for decoding a plurality of programs comprising:
   a transport engine configured to receive a plurality of programs and extract from each program a set of timing information and a set of timestamps embedded in the program;
   an adder configured to add a timing offset from a set of timing offsets to each of the sets of timing information to adjust the sets of timing information from a first time basis to a second time basis, wherein sums of the timing offsets and the timing information are referred to as the mapped-timing information, and the programs are associated, respectively, with the timing offsets;
   a correction engine configured to update the timing offsets as timing information is encountered in the programs;
   an offset register configured to:
   receive the timing offsets from the correction engine,
   store the timing offsets,
   associate each program and the program's associated timing offset via a program identifier, wherein each program identifier uniquely identifies one of the programs,
   receive a packet identifier from the transport engine,
   retrieve the timing offset associated with the received packer identifier, and
   transfer to the adder the timing offset associated with the received packet identifier and with the program associated with the timing offset,
   wherein the adder is configured to add the received timing offset offsets to the timestamps to adjust the time basis of the timestamps from the first time basis to the second time basis for the program associated with the received timing offset, and wherein sums of the timing offsets and the timestamps are referred to as a mapped timestamps; and
   a program decoder configured to receive the mapped timestamps to decode the program associated with the received timing offset.

2. The decoding system of claim 1, wherein:
   each of the timing offsets is associated with one of the sets of timing information and one of the sets of timestamps, and
   the adder is configured to add associated timing offsets and timing information, and add associated timing offsets and timestamps.

3. The decoding system of claim 1, wherein the first time basis is an encoder-clock time basis, and the second time basis is a decoder-clock time basis.

4. The decoding system of claim 1, wherein the set plurality of programs are configured to be transported in a transport stream.

5. The decoding system of claim 1, wherein:
   the adder includes a first adder and a second adder,
   the first adder is configured to add the timing offsets to the timing information, and
   the second adder is configured to add the timing offsets to the timestamps.

6. The decoding system of claim 1, wherein the timing information includes encoder-clock timing information.

7. The decoding system of claim 1, wherein the timing information includes time information and frequency information.

8. The decoding system of claim 1, wherein the program decoder is configured to substantially simultaneously decode the programs.

9. The decoding system of claim 1, wherein the timing offset includes timing information for timing differences between the first time basis and the second time basis.

10. The decoding system of claim 1, wherein:
    the timing information includes program-clock references (PCRs),
    the timestamps include one or both of a set of presentation timestamps (PTSs) and a set of decoding timestamps (DTS), and
    the timing offsets include PCR offsets.

11. The decoding system of claim 1, wherein the correction engine includes:
    a decoder clock configured to generate a decoder-clock signal;
    a local-time counter configured to receive the decoder-clock signal and accumulate the decoder-clock signal to generate accumulated-clock signals
    a comparator configured to calculate differences between the accumulated-clock signals and the mapped-timing information, wherein the differences are the set of timing offsets;
    a digital low pass filter (LPF) configured to receive the set of timing offsets from the comparator and filter the set of timing offsets; and
    a digital phase lock loop (PLL) configured to receive the set of timing offsets from the digital LPF and reduce jitter in the set of timing offsets, wherein the digital PLL is configured to transfer the set of timing offsets to the offset register.

12. The decoding system of claim 1, further comprising an offset selector configured to filter the timing offsets retrieved from the offset register.

13. The decoding system of claim 12, wherein the transport engine includes:
    a packet-identification (PID) table configured to store a program number and a set of PID numbers for each program; and a packet-identification (PID) filter configured to:
extract PID numbers embedded in the programs,
transfer the PID numbers to the PID table to retrieve the program numbers associated with the PID numbers, and
transfer the program numbers to the offset selector to select the timing offsets associated with the program numbers.

14. A decoding system for decoding a set of programs comprising:
a transport engine configured to receive a plurality of programs transported in a transport stream, and extract program-clock references (PCRs) and timestamps from the programs;
an adder configured to add the PCRs with PCR offsets to adjust the PCRs from an encoder-clock basis to a decoder-clock basis, wherein the sums are referred to as the mapped PCRs, each of the programs is associated with a PCR offset, and the PCR offsets represent timing differences between the encoder-clock basis and the decoder-clock basis;
a correction engine configured to update the PCR offsets as PCRs are encountered in the programs;
an offset register configured to receive the PCR offsets from the correction engine and transfer the PCR offsets to the adder, wherein i) the offset register is configured to store the PCR offsets for the plurality of programs, ii) the PCR offsets and the plurality of programs are respectively associated via a program identifier, which uniquely identifies one of the programs, iii) each program identifier uniquely identifies one of the programs, and iv) wherein the adder is configured to add the PCR offsets to the timestamps to map the timestamps from the encoder-clock basis to the decoder-clock basis, wherein summed timing offsets and timestamps are referred to as a mapped timestamps; and
a program decoder configured to receive the mapped timestamps to decode the program substantially simultaneously.

15. The decoding system of claim 14, wherein the timestamps include presentation timestamps (PTSs) and/or decoding timestamps (DTSs).

16. The decoding system of claim 14, wherein the correction engine includes:
a decoder clock configured to generate a decoder-clock signal in the decoder-clock basis;
a local-time counter configured to accumulate the decoder-clock signal to generate accumulated-clock signals;
a comparator configured to calculate differences between the accumulated-clock signals and the mapped PCRs, wherein the differences are the PCR offsets;
a digital low pass filter (LPF) configured to receive the PCR offsets from the comparator and filter the PCR offsets; and
a digital phase lock loop (PLL) configured to receive the PCR offsets from the digital LPF and reduce jitter in the PCR offsets, wherein the digital PLL is configured to transfer the PCR offsets to the offset register.

17. A multi-program decoding method comprising:
receiving a transport stream that includes a plurality of programs;
extracting, from each program, a set of program-clock references (PCRs) and a set of timestamps, which are associated with a first timing basis;
extracting a packet identifier (PID) from each of the programs as the PIDs are encountered in the programs;
transferring each of the PIDs to a PID table;
based on the transferring step, retrieving from the PID table a program identifier for each of the programs; and
transferring the program identifiers to a selector circuit to retrieve the timing offsets respectively associated with the programs;
generating based on the PCRs and a decoder-clock signal, a set of timing offsets that represents a difference between the first timing basis and a second timing basis, wherein each timing offset is associated with one of the programs and with the one of the programs'PCRs and timestamps;
storing the timing offsets in a storage registers;
associating the timing offsets with the programs in a respective manner in the storage register via program identifiers, which respectively identify the programs;
receiving one of the program identifiers in the storage resister;
retrieving the timing offset associated with the program identifier and with the program associated with the program identifier;
transferring the timing offset associated with the program identifier to an adder;
adding the timing offset to the timestamp associated with the timing offset to adjust the timing basis of the timestamp from the first timing basis to the second timing basis;
decoding the program associated with the received program identifier based on the timestamp adjusted to the second timing basis; and
repeating the generating step, the storing step, the associating step, the receiving step, the retrieving step, the transferring step, the adding step, and the decoding step for the plurality of programs to decode the programs substantially simultaneously.

18. The method of claim 17, wherein the step of generating the set of timing offsets includes:
mapping the PCRs from the first timing basis to the second timing basis based on the timing offsets, wherein the PCRs in the second timing basis are referred to as the mapped PCRs; and
generating differences between the mapped PCRs and the decoder-clock signals, wherein the differences are the timing offsets.

19. The method of claim 18, wherein the decoder-clock signals are accumulated-decoder-clock signals.

20. The method of claim 18, wherein the step of generating the set of timing offsets further includes:
digitally filtering the differences; and
digitally locking onto the differences for jitter correction.

21. The method of claim 18, wherein the step of mapping the PCRs from the first timing basis to the second timing basis includes, adding the PCRs to the PCRs' respectively associated timing offsets.

22. The method of claim 18, wherein the step of generating the timing offsets includes, for each timing offset, updating the timing offset for each of the PCRs received in the program associated with the timing offset as the PCRs are encountered in the program by repeating the steps of mapping the PCRs, and generating the differences.

23. The method of claim 17, and further comprising:
storing the timing offsets in a register; and
retrieving the timing offsets from a register to add the timestamps and timing offsets that are associated with the timestamps.

24. The method of claim 17, wherein the first timing basis is an encoder-clock basis and the second timing basis is a decoder-clock basis.

25. The method of claim 17, wherein the timing offsets are (PCR) offsets.

26. A multi-program decoding method comprising:
receiving a transport stream that includes a plurality of programs;
extracting, from each program, a set of program-clock references (PCRs) and a set of timestamps which are associated with a first timing basis;
generating based on the PCRs and a decoder-clock signal, a set of timing offsets that represents a difference between the first timing basis and a second timing basis, wherein each timing offset is associated with one of the programs and with the one of the programs' PCRs and timestamps, the step of generating the set of timing offsets includes:
  mapping the PCRs from the first timing basis to the second timing basis based on the timing offsets, wherein the PCRs in the second timing basis are referred to as the mapped PCRs;
  generating differences between the mapped PCRs and the decoder-clock signals, wherein the differences are the timing offsets; and
  updating the timing offset for each of the PCRs received in the program associated with the timing offset as the PCRs are encountered in the program by repeating the steps of mapping the PCRs, and generating the differences;
storing the timing offsets in a storage registers;
associating the timing offsets with the programs in a respective manner in the storage register via program identifiers, which respectively identify the programs;
receiving one of the program identifiers in the storage resister;
retrieving the timing offset associated with the program identifier and with the program associated with the program identifier;
transferring the timing offset associated with the program identifier to an adder;
adding the timing offset to the timestamp associated with the timing offset to adjust the timing basis of the timestamp from the first timing basis to the second timing basis;
decoding the program associated with the received program identifier based on the timestamp adjusted to the second timing basis; and
repeating the generating step, the storing step, the associating step, the receiving step, the retrieving step, the transferring step, the adding step, and the decoding step for the plurality of programs to decode the programs substantially simultaneously.

27. The method of claim 26, wherein the decoder-clock signals are accumulated-decoder-clock signals.

28. The method of claim 26, wherein the step of generating the set of timing offsets further includes:
digitally filtering the differences; and
digitally locking onto the differences for jitter correction.

29. The method of claim 26, wherein the step of mapping the PCRs from the first timing basis to the second timing basis includes, adding the PCRs to the PCRs' respectively associated timing offsets.

30. The method of claim 27 further comprising:
storing the timing offsets in a register; and
retrieving the timing offsets from a register to add the timestamps and timing offsets that are associated with the timestamps.

31. The method of claim 26, and further comprising:
extracting a packet identifier (PID) from each of the programs as the PIDs are encountered in the programs;
transferring each of the PIDs to a PID table;
based on the transferring step, retrieving from the PID table a program identifier for each of the programs; and
transferring the program identifiers to a selector circuit to retrieve the timing offsets respectively associated with the programs.

32. The method of claim 26, wherein the first timing basis is an encoder-clock basis and the second timing basis is a decoder-clock basis.

33. The method of claim 26, wherein the timing offsets are (PCR) offsets.

* * * * *